April 3, 1956 H. A. BING ET AL 2,740,338
LATCH FOR PHOTOGRAPHIC APPARATUS
Filed May 13, 1952 4 Sheets-Sheet 1

INVENTORS
Herbert A. Bing
Irving Erlichman
and
James E. Hunter, Jr.
BY Brown and Mikulka
and
Gerald Altman
ATTORNEYS April 3, 1956  H. A. BING ET AL  2,740,338
LATCH FOR PHOTOGRAPHIC APPARATUS
Filed May 13, 1952  4 Sheets-Sheet 3
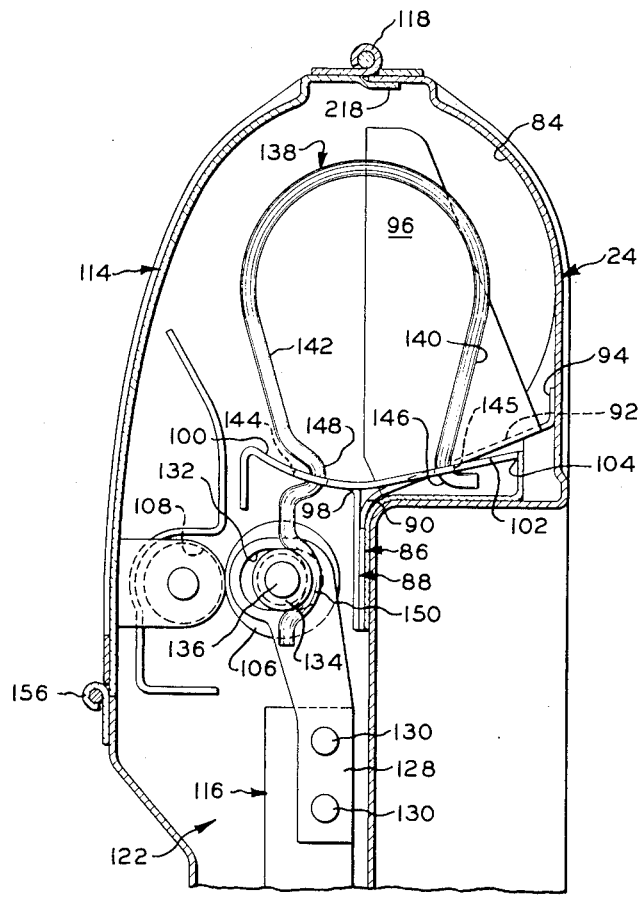
FIG. 3
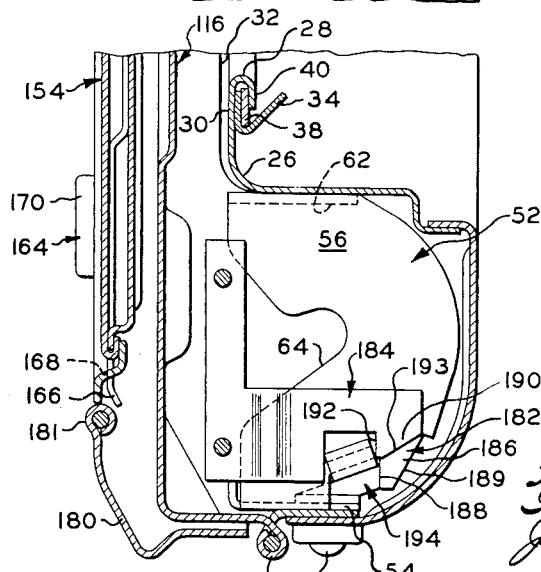
INVENTORS
Herbert A. Bing
Irving Erlichman and
James E. Hunter, Jr.
BY Brown and Mikulka
and
Gerald Altman
ATTORNEYS April 3, 1956 H. A. BING ET AL 2,740,338
LATCH FOR PHOTOGRAPHIC APPARATUS
Filed May 13, 1952 4 Sheets-Sheet 4

INVENTOR
Herbert A. Bing
Irving Erlichman and
James E. Hunter, Jr.
BY Brown and Mikulka
and
Gerald Altman
ATTORNEYS

United States Patent Office 2,740,338
Patented Apr. 3, 1956

2,740,338

LATCH FOR PHOTOGRAPHIC APPARATUS

Herbert A. Bing, Wellesley, Irving Erlichman, Newtonville, and James E. Hunter, Jr., Norwood, Mass., assignors to Polaroid Corporation, Cambridge, Mass., a corporation of Delaware Application May 13, 1952, Serial No. 287,538

5 Claims. (Cl. 95—11)

This invention relates to latches and more particularly to means for latching one portion of a camera housing to another portion thereof.

Objects of the present invention are: to provide, in a housing having portions which are movable with respect to each other and which define a passage when in predetermined relative positions, a latch for securing the portions in said predetermined relative positions without obstructing the passage; to provide a housing including a first portion and a second portion, said first and second portions, when in predetermined relative positions, defining a passage, means affixed to the first portion at opposite sides of the passage and providing a pair of recesses, a member slidably mounted on the second portion and providing, at its opposite ends, lugs extending in substantially the same direction, the lugs being adapted to project into the recesses in order to secure the portions in said predetermined relative positions; to provide a latch means of the above type including at least a bracket having a generally hook-shaped portion which includes a reentrant surface defining a recess and a cam surface, and a resilient member of predetermined configuration movably mounted on the other of said portions, said member providing at least a lug, said member being movable into an operative position and an inoperative position, said lug when in operative position being adapted to engage said cam surface and thereby to deform said member during movement of said second portion into juxtaposition with said first portion, said lug, when said second portion is in juxtaposition with said first portion, being disengaged from said cam surface and in alignment with said recess, said member, when said second portion is in juxtaposition with said first portion, being adapted to assume its predetermined configuration with said lug projecting into said recess and engaging said reentrant surface, said lug, when said member is in inoperative position, being adapted to clear said reentrant and cam surfaces during pivotal movement of said second portion with respect to said first portion; and to provide latch means of the above type which are simple in operation and inexpensive in construction.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 3 is a fragmentary, sectional view taken substantially along the line 3—3 of Fig. 2;

Generally, there is disclosed herein a handheld camera capable of effectuating the photographic process described in detail in Patent No. 2,543,181, issued to Edwin H. Land on February 27, 1951, for Photographic Product Comprising a Rupturable Container Carrying a Photographic Processing Liquid, said camera comprising a housing having a front portion, an intermediate portion and a rear portion. The front portion is provided with a lens and shutter. The intermediate and rear portions are pivotally connected to the front portion at opposite ends thereof. The intermediate portion when in closed position defines, in conjunction with the front portion, an exposure chamber. The rear and intermediate portions when in closed position define, between their overlapping surfaces, an exposure chamber. Successive frames of a photosensitive sheet may be successively positioned within the exposure chamber in order to produce latent images therein. At the entrance to the processing chamber, there is provided a pair of pressure-applying rollers which are adapted to receive therebetween the photosensitive sheet from the exposure chamber and to superpose and register the photosensitive sheet with another sheet. The other sheet has on one surface thereof a succession of image-receiving areas which are registrable with the frames and has affixed thereto a succession of containers of processing composition, one container being associated with one image-receiving area. When the sheets are advanced in superposed relation between the pressure-applying rollers, processing composition is ejected from a container and is spread in a thin layer between a frame of the photosensitive sheet and an image-receiving area of the other sheet, thereby forming a sandwich which advances into the processing chamber. The aforementioned frame and area are allowed to remain in the processing chamber for a predetermined time during which the latent image in the frame is developed and a positive print is formed in the image-receiving area with which the frame is registered. At the end of a predetermined time, the processing chamber may be opened and the developed positive print may be removed. In accordance with the present invention, a novel latch means is provided which is adapted to secure the intermediate and rear portions of the camera housing in closed position without obstructing advancement of the sandwich through the processing chamber.

Figure 1:
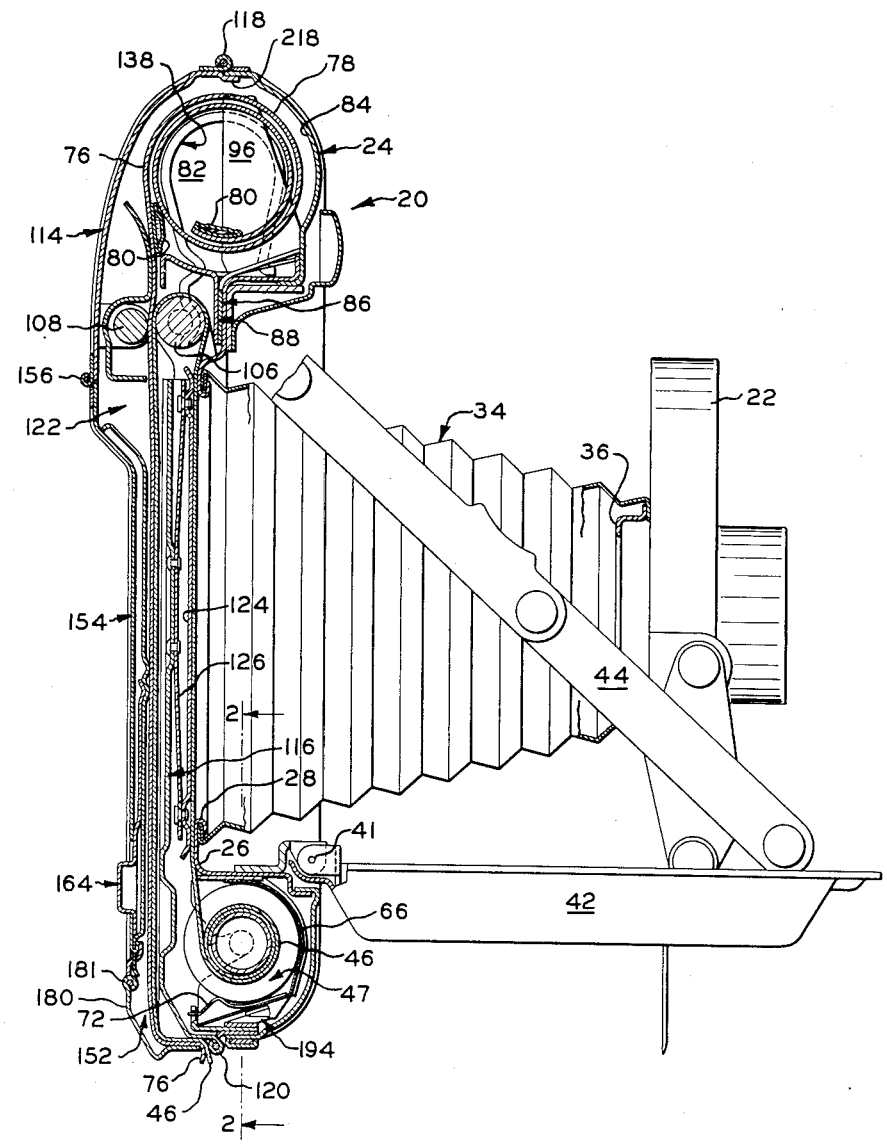
Figure 1 is a diagrammatic, fragmentary view, partly in section, of a handheld camera embodying the herein disclosed invention with a photosensitive sheet and another sheet mounted therein, the section being taken along a line midway between the sides of the camera.

Referring now to the drawings, wherein like numerals denote like parts, there is shown in Fig. 1 a handheld camera of the folding type which embodies the present invention. As a means for supporting and enclosing the various components of the camera, a housing, generally designated at 20, is provided. Associated with housing 20 is a suitable lens and shutter assembly 22. In the form shown, housing 20 comprises a front portion 24 which provides a central reentrant section 26 having a light-transmitting aperture 28. Section 26 (Fig. 3) further provides guide surfaces 30 which surround aperture 28 and guide tracks 32 on opposite sides of aperture 28 which serve to position a photosensitive sheet for exposure in the focal surface of the lens of assembly 22. A suitable bellows 34 provides an optical path from the lens of assembly 22 to a photosensitive sheet positioned adjacent aperture 28 by surfaces 30 and tracks 32. One end of bellows 34 is fastened in lighttight fashion to assembly 22 by such means as a centrally apertured, dished-out, clamping plate 36 suitably connected to assembly 22. The other end of bellows 34 is fastened in lighttight fashion to reentrant section 26 by such means (Fig. 3) as a gasket 38 and in-turned clamping flanges 40. Pivotally mounted on front portion 24, as at 41, is a bed 42 which is adapted to support assembly 22 when in open position and which, in conjunction with reentrant section 26, encloses and protects assembly 22 when in closed position. A suitable linkage, designated generally at 44, is provided for erecting assembly 22 when bed 42 is in open position.

Figure 2:
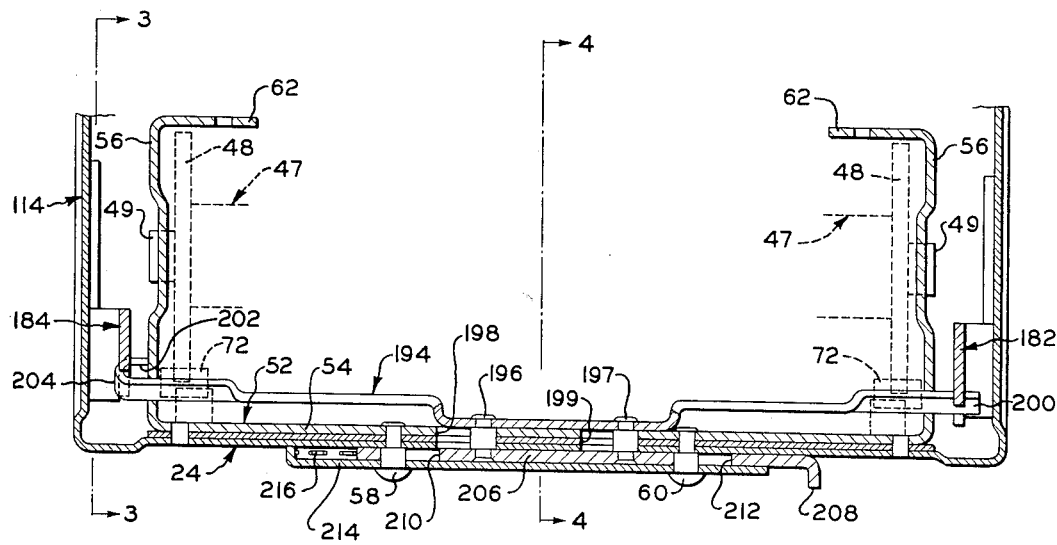
Fig. 2 is an enlarged, fragmentary, sectional view taken substantially along the line 2—2 of Fig. 1.
Figure 5:
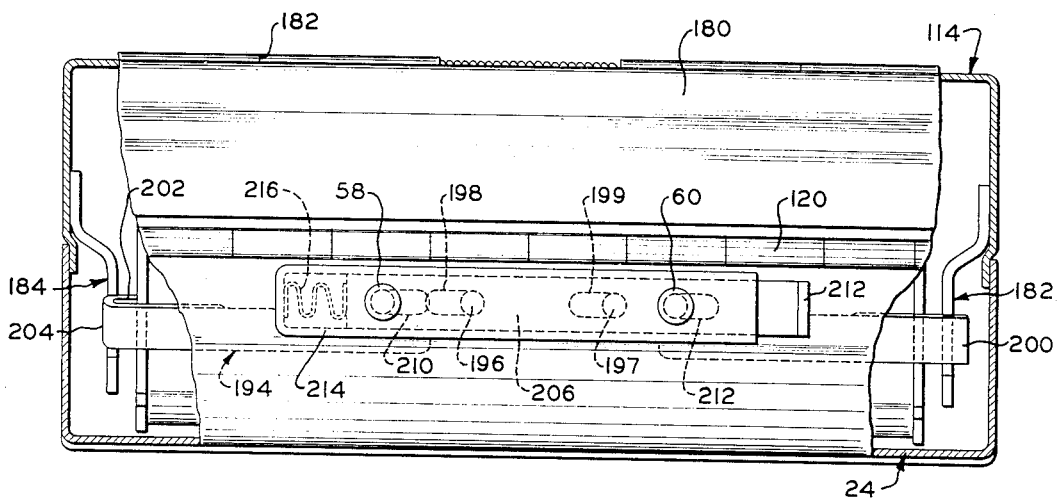
Fig. 5 is a bottom plan view taken substantially along the line 5—5 of Fig. 2.

One example of a supply of photosensitive sheet which is adapted to be exposed and processed within the illustrated camera is shown in Fig. 1 as being mounted within housing 20. This supply includes a photosensitive sheet 46 which preferably comprises a suitable base and a suitable photosensitive layer on one side of the base. The photosensitive layer, for example, may be composed of a silver halide emulsion and is provided with a succession of frames which are adapted to receive a succession of latent images upon photoexposure. The supply of sheet 46 is carried by a spool 47 of conventional design (Figs. 1 and 2) having a spindle around which sheet 46 is coiled, a pair of disks 48 for aligning the successive convolutions of sheet 46, and a pair of stub shafts 49 extending from opposite ends of the spool.

As a means for mounting the supply of photosensitive sheet, there is provided a U-shaped member 52 having a bight portion 54 and a pair of legs 56. Viewing Fig. 3, bight portion 54 is secured to the lower edge of front portion 24 by means of rivets 58 and 60. Legs 56 are positioned adjacent opposite edges of front portion 24 and are securely seated by means of pairs of in-turned stubs 62 suitably secured to the front portion. Each leg 56 is provided with a slot 64 which is adapted to receive one of stub shafts 49. When stub shafts 49 are seated in slots 64, disks 48 act to prevent longitudinal movement of spool 47. In the illustrated embodiment, a light shield 66 is affixed to member 52, as at 68 and 70, and extends around spool 47 to protect photosensitive sheet 46 from ambient light. Such means as a pair of drag springs 72, secured as at 74 to shield 66, are provided for engaging disks 48 in order to lock stub shafts 49 in slots 64 and to prevent excess rotation of spool 47.

Another sheet 76, in conjunction with which photosensitive sheet 46 may be processed, is shown in Fig. 1 as being supplied from a roll 78. Sheet 76 preferably comprises a suitable base and a suitable image-receiving layer on one side of the base. The image-receiving layer, for example, may comprise one of the compositions, now well known in the art, which adapt it to receive, in successive image-receiving areas thereof, positive prints of the latent images in frames of photosensitive sheet 46. A succession of containers, designated generally at 80 in the illustrated embodiment, are provided for carrying a liquid processing composition. As shown, containers 80 are affixed to the image-receiving layer of sheet 76 at substantially regularly spaced intervals from a location adjacent a leading end thereof toward the trailing end thereof, containers 80 being so spaced that one container is associated with one image-receiving area. Each container is provided with a rupturable mouth, facing the trailing end of sheet 76, which mouth is adapted to eject processing composition when opposed compressional forces are applied to the container.

Means are provided for mounting roll 78 within housing 20. As shown (Figs. 1 and 3), roll 78 is mounted in a compartment 82 having walls that are provided by a section 84 of front portion 24 and by various sections of a sheet metal member 86 and a sheet metal member 88. Details of members 86 and 88 are advantageously shown in Fig. 3. Member 86 is suitably fastened to front portion 24 as by means of a rivet (not shown) and is bent, as at 90, to provide a wall 92. Extending from wall 92 adjacent opposite edges thereof are a pair of flanges 94 (one of which is shown in Fig. 3) which are suitably connected to section 84. Extending from opposite edges of wall 92 are a pair of armlike walls 96 which are adapted to retain the opposite ends of roll 78. Member 88, like member 86, is fastened to front portion 24 by suitable means. Member 88 is bent, as at 98, to form a continuation 100 of wall 92. A pair of legs 102, which are struck up from the opposite edges of member 88, straddle walls 92 and 96 and are suitably fastened to front portion 24 as at 104.

Pressure-applying means are provided for processing latent images in frames of sheet 46. In the form shown, the pressure-applying means comprises a pair of rollers 106 and 108 between which sheets 46 and 76 may be advanced in superposed relation. Advancement of a frame of sheet 46 and an associated image-receiving area of sheet 76 between the rollers causes ejection of processing composition from the mouth of a container 80 and spreading of the processing composition between the frame and the area to form a sandwich in which the latent image in the frame is processed and a positive print is formed in the area.

In accordance with the present invention, means are provided which define an exposure chamber wherein latent images may be formed in frames of sheet 46 and a lighttight processing chamber into which a sandwich formed between rollers 106 and 108 may be stored for a predetermined processing time. Said means, in the form shown, comprise a rear portion 114 and an intermediate portion 116 of housing 20. Viewing Fig. 1, rear portion 114 is pivotally attached to the upper extremity of front portion 24, as by means of a hinge 118, and intermediate portion 116 is pivotally attached to the lower extremity of front portion 24, as by means of a hinge 120. Portions 114 and 116, when in open position, provide access to the interior of the camera. When in closed position, portion 116 defines an exposure chamber in conjunction with front portion 24 and bellows 34. When in closed position, portions 114 and 116 define between their adjacent overlapping surfaces a processing chamber 122.

As a means for holding a portion of sheet 46 in exposure position on guide surfaces 30 and between guide tracks 32, a pressure plate 124 (Figs. 1 and 3) is provided. As shown, plate 124 is mounted on intermediate portion 116 by a leaf spring 126, the central section of which is suitably connected to the intermediate portion and the ends of which are suitably connected to the plate.

In the illustrated embodiment, roller 106 (Fig. 3) is mounted on intermediate portion 116 and roller 108 is mounted on rear portion 114, the rollers being so arranged as to be operatively juxtaposed when portions 114 and 116 are in closed position and to be spaced apart to permit sheets 46 and 76 to be extended therebetween when portions 114 and 116 are in open position.

In order to generate pressure between rollers 106 and 108, means are provided for resiliently biasing roller 106 toward roller 108 when portions 114 and 116 are in closed position. As shown, roller 106 is mounted on a pair of supports 128 which are positioned at opposite edges of the free end of intermediate portion 116 by such means as rivets 130. Each support 128 is provided with an elongated bearing slot 132 into which a slidable bushing 134 projects. Extending from opposite ends of roller 106 are a pair of stub shafts 136 which are received in bushings 134. By virtue of the slidable construction of bushings 134 in slots 132, roller 106 is movable longitudinally of slot 132 or, otherwise stated, is linearly movable toward and away from roller 108 when rollers 106 and 108 are operatively juxtaposed. The resilient biasing means, in the illustrated embodiment, comprises a pair of flexed, substantially U-shaped springs 138 which are mounted on opposite sides of housing 20, each spring being mounted between a wall 96 of member 86 and a side of front portion 24. Each spring 138 comprises a pair of legs 140 and 142. Springs 138 are mounted on opposite edges of member 88 with legs 142 extending into a pair of elongated slots 144 at opposite edges of continuation 100 and with legs 140 extending into a pair of slots 145 in legs 102. Hooked sections 146 and 148 are adapted to prevent dislodgement of legs 140 and 142 from slots 144 and 145, respectively. Slots 144 are sufficiently elongated to allow considerable movement of legs 142 toward and away from legs 140. Legs 142 are provided with arcuate extensions 150 which are adapted to engage peripheral grooves on the peripheries of bushings 134. Viewing Fig. 3, if intermediate portion 116 is in open position, arcuate extensions 150 are spaced from bushings 134 and hooked sections 148 are resiliently urged into abutment with the left ends of slots 144. If intermediate portion 116 and rear portion 114 both are pivoted into closed position, arcuate extensions 150 engage bushings 134 and bias roller 106 against roller 108.

In practice, sheet 46 extends from spool 47 (Fig. 1) past guide surfaces 30 (Fig. 3) and into contact with roller 106. Sheet 76 extends from roll 78 into contact with roller 108 and into superposition with sheet 46 to form therewith a sandwich which extends between the rollers and into processing chamber 122. Viewing Fig. 1, the lower sections of rear and intermediate portions 114 and 116 are so constructed as to provide processing chamber 122 with an exit passage 152 through which portions of the sandwich positioned within the processing chamber may be removed therefrom. An operator, by grasping the leading portion of the sandwich extending from passage 152, may draw the sandwich through the passage and thereby may advance unprocessed portions of sheets 46 and 76 between rollers 106 and 108 and into processing chamber 122. Thus, a frame of sheet 46, initially positioned for exposure on guide surfaces 30, may be advanced toward registration with an image-receiving area of sheet 76. Continued advancement of sheets 46 and 76 between rollers 106 and 108 causes ejection of processing composition from the container 80 associated with the frame and area and causes spreading of the processing composition between the frame and area to form a sandwich which advances into processing chamber 122. This sandwich is permitted to remain within processing chamber 122 for a predetermined time during which the latent image in the frame is processed and a positive print is formed in the image-receiving area.

Figure 4:
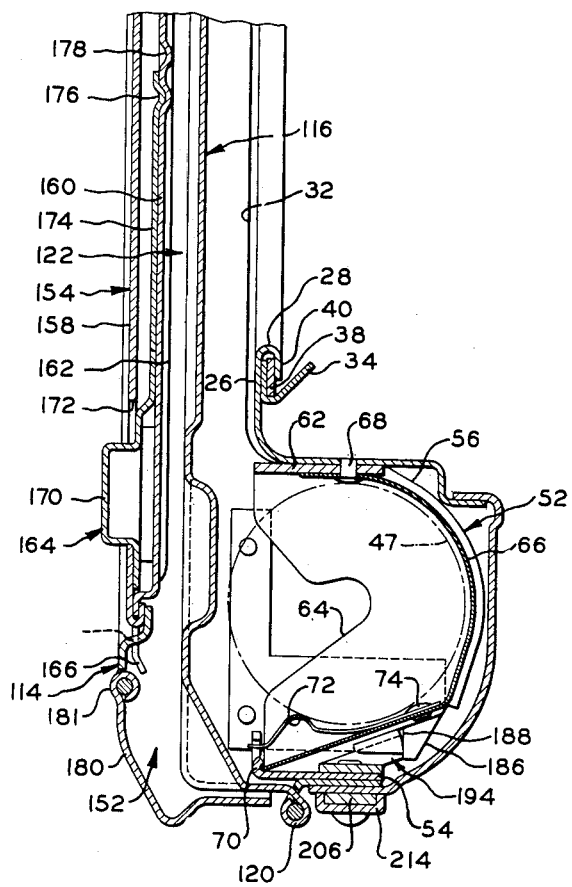
Fig. 4 is a fragmentary, sectional view taken substantially along the line 4—4 of Fig. 2.
Figure 6:
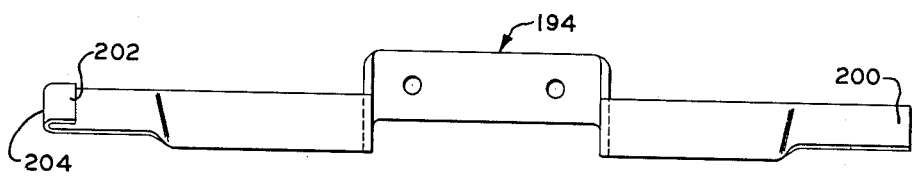
Fig. 6 is a top plan view of a portion of the herein disclosed latch means.

A suitable closure means, such as a door 154 (Figs. 1 and 4), is provided to enable an operator to remove the developed positive print from processing chamber 122. As shown, door 154 is pivoted, as at 156, to rear portion 114 of housing 20. Door 154 comprises an outer sheet-like element 158 and an inner sheet-like element 160. Element 158 is provided with a plurality of ribs 162, the convex surfaces of which serve to guide the sandwich as it advances through processing chamber 122. Suitable means are provided for latching door 154 in closed position, said means, in the form shown, comprising a channel-shaped carriage 164, the legs of which ride on the concave surfaces of two of the aforementioned ribs 162. Extending from carriage 164 is a tongue 166 which is adapted to extend through a slot 168 in rear portion 114 when door 154 is in closed position. By such means as a button 170, which may be stamped out of carriage 164 and which extends through an elongated slot 172 in element 158, an operator may slide tongue 166 into slot 168 in order to latch door 154 in closed position, or may slide tongue 166 out of slot 168 in order to permit the opening of door 154. An extension 174 of carriage 164 is provided with a detent 176 which is adapted to coact with a pair of depressions 178 in member 160 to fix tongue 166 in its latched or unlatched position. When an image-receiving area and a frame with which it is registered have remained in processing chamber 122 for a predetermined processing time, door 154 may be opened. The positive print now may be ripped from the remainder of sheet 76, the ripping being aided by a series of perforations (not shown) which separate the image-receiving area from the remainder of sheet 76, and at the same time may be peeled from the frame of sheet 46 with which it has been registered.

It is desirable that light be excluded from chamber 122 during the processing of a frame and an area registered therewithin. In accordance with the present invention, means are provided for rendering exit 152 lighttight. As shown, this means comprises a bar 180 pivoted to rear portion 114, as at 181, and having edge portions which, when bar 180 is in closed position, snugly contact portions of housing 20 which are adjacent to passage 122. Such means as a coiled spring (not shown) is adapted to urge bar 180 into closed position. The edge of bar 180 normally is in contact with superposed sheets 46 and 76 extending from exit 152 and serves as a cutting blade by which an operator can sever a sandwich extending through passage 152 from one remaining within chamber 122.

In accordance with the present invention, latch means are provided for securing rear portion 114 in closed position, said latch means operating adjacent the edges of housing 20 in order not to obstruct exit passage 152. The latch means in the form shown comprises a pair of brackets 182 and 184 which are suitably affixed to opposite edges of rear portion 114 so as to straddle processing chamber 122. Bracket 182 provides a generally hook-shaped portion 186 having an inner reentrant surface 188 which defines a recess and an outer cam surface 189. Bracket 184 provides a generally hook-shaped portion 190 having an inner reentrant surface 192 which defines a recess and an outer cam surface 193. It is to be noted that the hook-shaped portion of bracket 184 is farther away from the lower edge of housing 20 than is the hook-shaped portion of bracket 182. A resilient elongated member or blade 194 of predetermined configuration is slidably mounted on front portion 24 by means of a pair of stud rivets 196 and 197 which extend respectively through a pair of elongated slots 198 and 199. Blade 194 is adapted to coact with hook-shaped portions 186 and 190 in the following manner. The extremities of blade 194 constitute a pair of lugs 200 and 202, blade 194 being reversely bent as at 204, so that lugs 200 and 202 extend in the same direction. Blade 194 is movable into an operative position and an inoperative position. Lugs 200 and 202, when blade 194 is in operative position, are adapted to engage cam surfaces 189 and 193 and thereby to deform blade 194 during pivotal movement of rear portion 114 into juxtaposition with front portion 24. Lugs 200 and 202, when rear portion 114 is in juxtaposition with front portion 24, are disengaged from hook-shaped portions 186 and 190 and are engaged with reentrant surfaces 188 and 192. Blade 194, when rear portion 114 is in juxtaposition with front portion 24, is adapted to assume its predetermined configuration so that lugs 200 and 202 project into the recesses defined by reentrant surfaces 188 and 192. Lugs 200 and 202, when blade 194 is in inoperative position, are adapted to clear hook-shaped portions 186 and 190 during pivotal movement of rear portion 114 with respect to front portion 24.

As a means for enabling an operator to determine selectively whether blade 194 is in operative or in inoperative position, a manually operable slide 206 is reciprocally mounted on front portion 24. Slide 206 has a turned end 208 which may be caught by the fingers of an operator and a pair of elongated slots 210 and 212 into which rivets 58 and 60 extend respectively. Slide 206 is connected to blade 194 by stud rivets 196 and 197. A channel-shaped member 214 is affixed to front portion 24 as by means of rivets 58 and 60 in order to shield the greater portion of slide 206 from view. Viewing Fig. 2, a resilient means such as spring 216, one end of which abuts against member 214 and the other end of which abuts against slide 206, normally urges slide 206 to the right and blade 194 into operative position.

Means are provided for automatically causing pivotal movement of rear portion 114 out of juxtaposition with front portion 24 upon disengagement of lugs 200 and 202 from hook-shaped portions 186 and 190 when an operator causes movement of blade 194 into its inoperative position. In the illustrated embodiment, this means comprises a resilient flange 218 (Fig. 3), integral with rear portion 114, which is slightly deformed when rear portion 114 is in juxtaposition with front portion 24 and which, in attempting to regain its normal configuration, biases rear portion 114 outwardly with respect to front portion 24.

In the operation of the illustrated camera, an operator, by engaging turned end 208, may urge blade 194 into inoperative position so that lugs 200 and 202 will clear hook-shaped portions 186 and 190 whereby rear portion 114 and intermediate portion 116 may be pivoted to open position to provide access to the interior of housing 20. Now, spool 47 is mounted on member 52 and roll 78 is inserted into compartment 82. Sheet 46 is drawn from spool 47 onto guide surfaces 30, which position frames of sheet 46 in the focal surface of the lens of assembly 22. Sheets 46 and 76 are now superposed and are extended from roller 106 along the rear surface of intermediate portion 116 to a point beyond the pivoted end thereof. Rear portion 114 is now pivoted to closed position in order to operatively juxtapose rollers 106 and 108 and to form processing chamber 122. Lugs 200 and 202 engage hook-shaped portions 186 and 190 and thereby deform blade 194 during pivotal movement of rear portion 114 into juxtaposition with front portion 24. Lugs 200 and 202 project into recesses 188 and 192 when they become aligned therewith. The leading ends of sheets 46 and 76 now are grasped and are drawn from processing chamber 122 until the leading frame of sheet 46 is in position for exposure. After exposure of this frame, an operator once again may grasp the leading ends of sheets 46 and 76 and advance the sheets between rollers 106 and 108. During advancement of sheets 46 and 76 between rollers 106 and 108 and into processing chamber 122, processing composition is ejected from the trailing edge of a container 80 and is spread between a frame of sheet 46 and an image-receiving area of sheet 76, the processing composition acting to process the frame and to form in the image-receiving area a positive print. When the superposed frame and image-receiving area have remained in processing chamber 122 for a predetermined processing period, door 154 may be opened and the section of sheet 76 which carries the positive print may be ripped from the remainder of sheet 76 and at the same time peeled from the frame of sheet 46. As the exposure and processing cycle continues, portions of sheets 46 and 76 which extend through exit 152 may be evenly severed from the remainder of the sheets by means of the cutting edge of bar 180.

It is to be expressly understood that the herein disclosed invention may be applied to numerous structures other than the camera herein illustrated. The invention, for example, may be applied to various processing units which are not directly associated witth a photographic exposure means.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera housing, first and second sections movable with respect to one another into juxtaposed relation and an intermediate section normally located between said first and second sections and to define in conjunction therewith, respectively, first and second chambers through which sheet material may be advanced, said second chamber having an exit passage in an end wall of said second section through which sheet material may advance from said second chamber, latch means securing said sections in juxtaposition, said latch means including a pair of brackets having hook-shaped portions each including an inner reentrant surface and an outer cam surface, said brackets being attached to opposite sides of said second section adjacent said passage and extending within said housing on opposite sides of said intermediate section and said second chamber into said first chamber, and a generally flat resilient deformable member of predetermined configuration mounted within said first chamber on an end wall of said first section and being disposed closely adjacent said end wall, said member including a pair of lugs extending substantially in the same direction and being mounted for movement transversely of said passage into operative and inoperative position, said lugs, when in operative position, engaging said reentrant surfaces of said brackets for retaining said sections in juxtaposition and being so located in the path of movement of said cam surfaces as to coact therewith and cause said resilient member to be deformed toward said end wall of said first section during movement of said second section into juxtaposition with said first section, said hook-shaped portions being movable, by virtue of the deformation of said resilient member, past said lugs to permit the movement of said second section into juxtaposition, said resilient member, when said sections are in juxtaposition, being adapted to assume its undeformed predetermined configuration with said lugs engaging said reentrant surfaces, said lugs, when in inoperative position, being located out of engagement with and out of the path of movement of said hook-shaped portions.

2. In photographic apparatus, a housing having first and second sections pivotally secured together at one of their ends and being pivotable into juxtaposition and an intermediate section pivoted to said first section at its other end opposite said one end and normally located between said first and second sections, said intermediate section being so constructed as to define, in conjunction with said first and second sections when the latter are in juxtaposition, respectively, first and second chambers, said second chamber lying substantially in a plane and having an exit passage in an end wall of said second section at said other end thereof through which said sheet material is movable from said second chamber, latch means securing said first and second sections in juxtaposition, said latch means comprising a pair of substantially flat arms mounted on opposite sides of said second section adjacent said passage and extending within said housing on opposite sides of said intermediate section into said first chamber, said arms having generally hook-shaped portions including inner reentrant surfaces and outer cam surfaces, a substantially flat manually engageable member slidably mounted on the exterior of an end wall of said first section at said other end thereof, a substantially flat resilient member of normally predetermined configuration mounted on the last-mentioned end wall within said first chamber transversely of said passage and being disposed closely adjacent said end wall, the central portion of said resilient member being connected to said manually engageable member, said resilient member including end sections extending substantially in the same direction and being mounted for movement in the direction of its elongation into operative and inoperative positions, said ends sections of said resilient member, when in operative position, engaging said reentrant surfaces of said arms for retaining said first and second sections in juxtaposition and being so located in the path of movement of said cam surfaces as to coact therewith and cause said resilient member to be deformed toward said end wall of said first section during pivotal movement of said section into juxtaposition, said hook-shaped portions being movable by virtue of the deformation of said resilient member past said end sections to permit the movement of said second section into juxtaposition, said resilient member being adapted to assume its undeformed predetermined configuration with said end sections in engagement with said reentrant surfaces, said end sections, when in inoperative position, being located out of engagement with and out of the path of movement of said hook-shaped portions, and resilient means normally urging said resilient member into operative position.

3. In a housing for photographic apparatus, first and second sections movable with respect to one another into juxtaposition wherein said sections define a relatively flat processing chamber into which said sheet materials are advanced, an end wall of said second section cooperating to define an exit passage through which said sheet materials may be advanced from said processing chamber, means including one wall of said exit passage defining a storage chamber located within said first section of said housing adjacent said exit passage, said storage chamber being so constructed as to mount and house a roll of photographic sheet material, latch means securing said first and second sections in juxtaposition, said latch means including a pair of brackets having hook-shaped portions each including an inner reentrant surface and an outer cam surface, said brackets being secured to opposite sides of said second section adjacent said passage and extending within said housing adjacent opposite ends of said storage chamber, and a generally flat elongated resilient deformable member of predetermined configuration mounted on an end wall of said first section between the latter and said storage chamber for movement in the direction of its elongation transversely of said passage, said resilient member including a pair of lugs extending substantially in the same direction and movable into operative and inoperative positions, said lugs, when in operative position, engaging said reentrant surfaces of said brackets for retaining said sections in juxtaposition and being so located in the path of movement of said cam surfaces as to coact therewith and cause said resilient member to be deformed toward said end wall of said first section during movement of said second section into juxtaposition with said first section, said hook-shaped portions being movable by virtue of the deformation of said resilient member past said lugs to permit the movement of said second section into juxtaposition, said resilient member, when said sections are in juxtaposition, being adapted to assume its undeformed predetermined configuration with said lugs engaging said reentrant surfaces, said lugs, when in inoperative position, being located out of the path of movement of said hook-shaped portions.

4. In a housing for photographic apparatus, a forward section including end and side walls, a rear section including rear, end and side walls pivoted to said forward section for movement into juxtaposition therewith and an intermediate section normally positioned between and cooperating with said forward and rear sections, respectively, to provide forward and rear chambers through which photographic sheet material may be advanced, said end wall of said rear section cooperating with a portion of said intermediate section to provide an exit passage at the end of said rear chamber through which said sheet material may be advanced from said chamber, means within said forward chamber adjacent said exit passage for providing a storage chamber adapted to mount and house a roll of photographic sheet material, said portion of said intermediate section comprising one wall of said exit passage forming one wall of said storage chamber, latch means for securing said forward and rear sections in juxtaposition, said latch means comprising a pair of substantially flat arms mounted on opposite sides of said rear section adjacent said passage and extending between said side walls of said forward section adjacent opposite ends of said storage chamber, said arms having generally hook-shaped portions including inner reentrant surfaces and outer cam surfaces, and a generally flat enlongated resilient deformable member of predetermined configuration mounted within said forward chamber on said end wall of said forward section between said end wall and said storage chamber for movement in the direction of its elongation transversely of said passage, said member including a pair of lugs extending substantially in the same direction and moveable with said member into operative and inoperative positions, said lugs, when in operative position, engaging said reentrant surfaces of said brackets for retaining said forward and rear sections in juxtaposition and being so located in the path of movement of said cam surfaces as to coact therewith and cause said resilient member to be deformed toward said end wall of said forward section during movement of said rear section into juxtaposition, said hook-shaped portions being movable by virtue of the deformation of said resilient member past said lugs so as to permit the movement of said rear section into juxtaposition, said resilient member, when said sections are in juxtaposition, being adapted to assume its undeformed predetermined configuration with said lugs engaging said reentrant surfaces, said lugs, when said member is in inoperative position, being located out of engagement with and out of the path of movement of said hook-shaped portions.

5. In a camera housing, a forward section including end and side walls, a rear section including rear, end and side walls pivoted to said forward section about one end of said section for movement into juxtaposition with said forward section and an intermediate section normally located between said forward and rear sections and cooperating with said sections to form, respectively, forward and rear chambers through which photographic sheet material is advanced, said end wall of said rear section and a portion of said intermediate section adjacent said end wall cooperating to provide an exit passage at the end of said rear chamber through which said sheet material may be advanced from said chamber, means within said forward chamber adjacent said exit passage for providing a storage chamber adapted to mount and house a roll of photographic sheet material, said portion of said intermediate section comprising one wall of said exit passage forming the rear wall of said storage chamber, latch means for securing said forward and rear sections in juxtaposition, said latch means comprising a pair of laterally spaced substantially flat brackets secured to said rear wall in substantially parallel relation to said side walls of said rear section and extending between said side walls of said forward section adjacent opposite ends of said storage chamber, said brackets having generally hook-shaped portions each including an inner reentrant surface and an outer cam surface, a generally flat manually engageable member slidably mounted on the exterior of said end wall of said forward section and a substantially flat elongated resilient member of normally predetermined configuration mounted within said forward chamber on said end wall of said forward section between said end wall and said means comprising said storage chamber, said resilient member extending transversely of said forward chamber and mounted for movement in the direction of its elongation into operative and inoperative positions, the ends of said resilient member extending substantially in the same direction and being deformable toward said end wall of said forward section, spring means normally urging said resilient member into operative position, said ends of said resilient member, when in operative position, engaging said reentrant surfaces of said brackets for retaining said forward and rear sections in juxtaposition and being so located in the path of movement of said cam surfaces as to simultaneously coact therewith and cause said resilient member to be deformed toward said end wall of said forward section during movement of said rear section into juxtaposition, said hook-shaped portions being moveable by virtue of the deformation of said resilient member past said ends thereof so as to permit the movement of said rear section into juxtaposition, said resilient member, when said sections are in juxtaposition, assuming its undeformed predetermined configuration with said ends engaging said reentrant surfaces, said ends, when said resilient member is in inoperative position, being located out of engagement with and out of the path of movement of said hook-shaped portions.

References Cited in the file of this patent

UNITED STATES PATENTS

| | | |
|---|---|---|
| 116,646 | Van | July 4, 1871 |
| 1,823,299 | Stuber | Sept. 15, 1931 |
| 2,233,028 | O'Connor | Feb. 25, 1941 |
| 2,455,111 | Carbone | Nov. 30, 1948 |
| 2,506,863 | Fassin | May 9, 1950 |
| 2,516,398 | Land | July 25, 1950 |
| 2,548,549 | Mihalyi | Apr. 10, 1951 |